Figure 5:
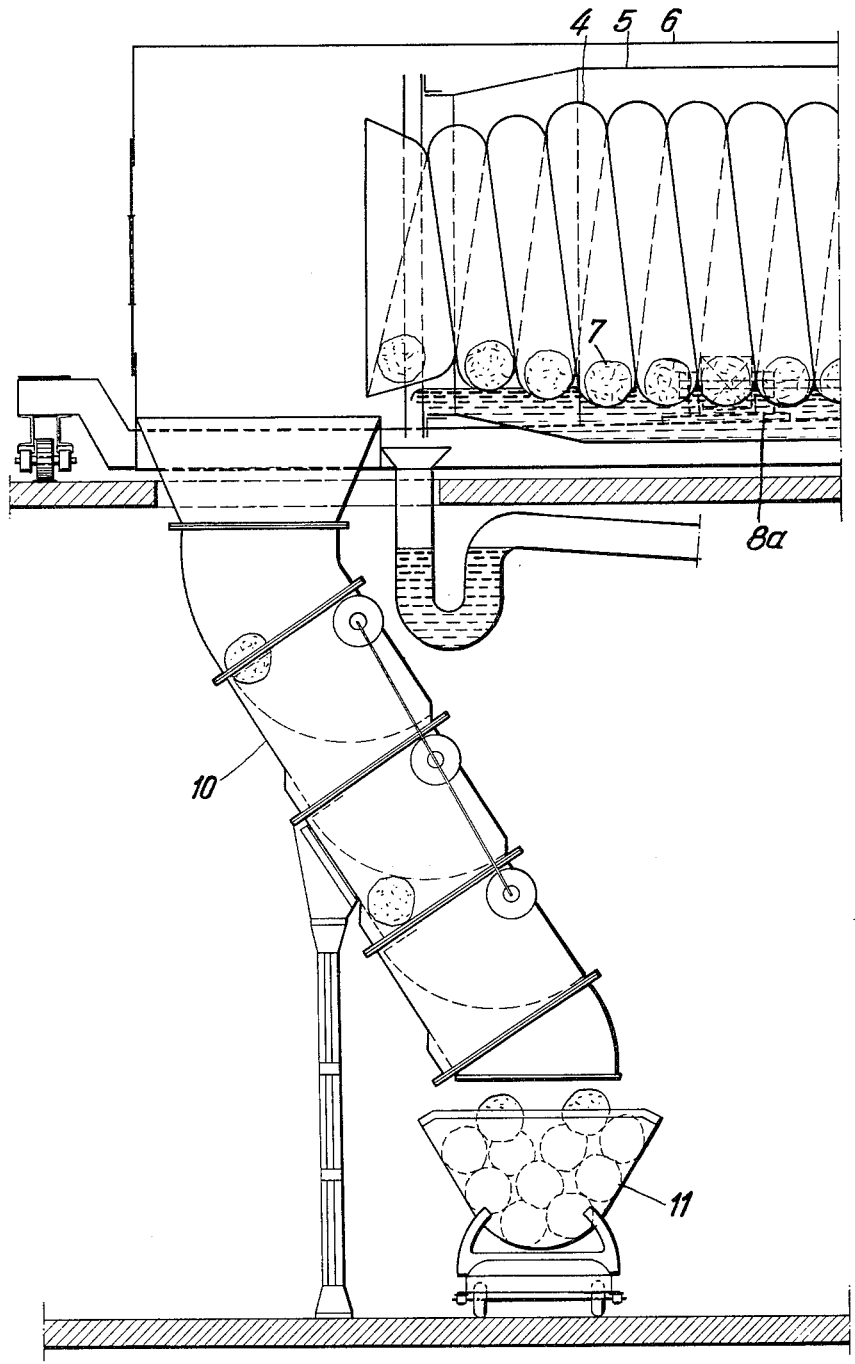

Dec. 14, 1965 E. WOLF 3,223,508
MIXING DEVICE FOR ADMIXING ADDITIVES TO A MELT
Filed Feb. 9, 1961 3 Sheets-Sheet 1
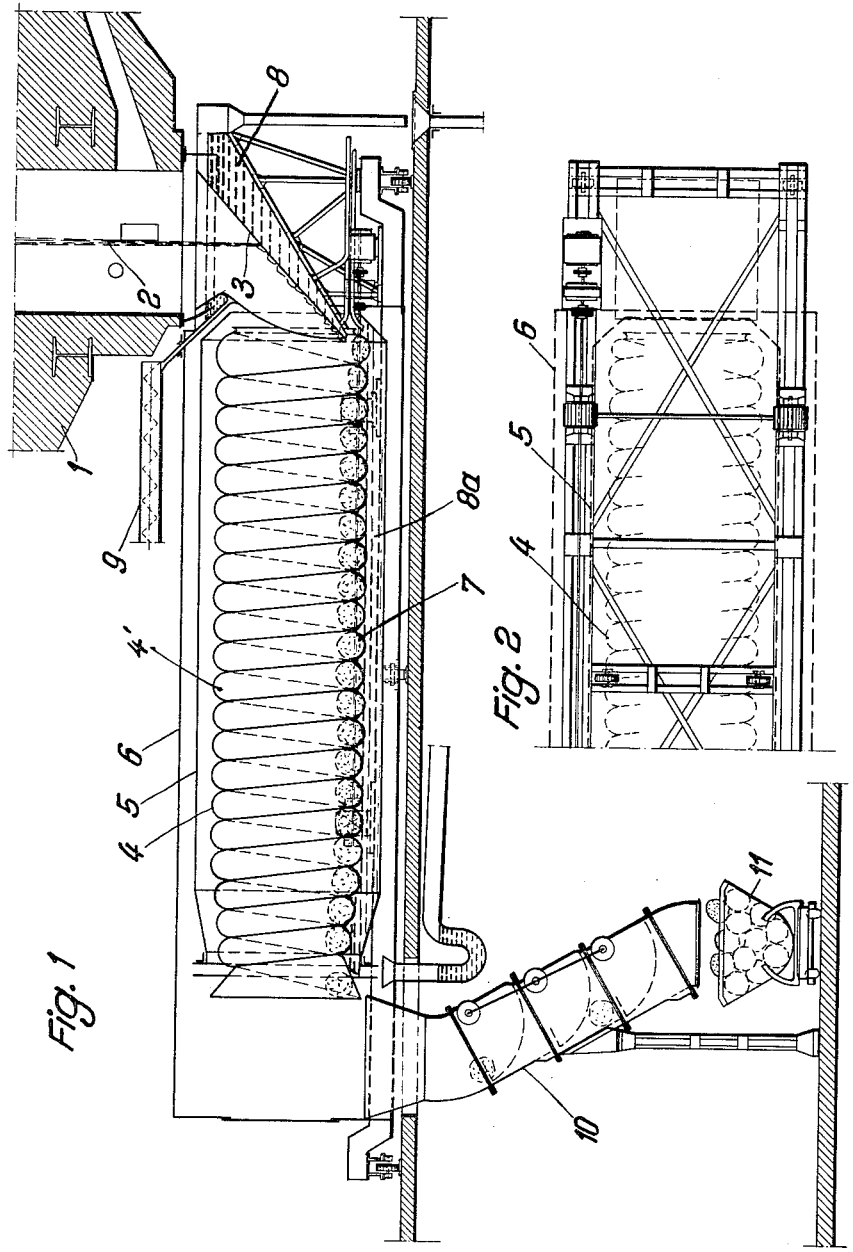
Inventor:
ERICH WOLF
By Hane and Nydick
ATTORNEYS Dec. 14, 1965  E. WOLF  3,223,508
MIXING DEVICE FOR ADMIXING ADDITIVES TO A MELT
Filed Feb. 9, 1961  3 Sheets-Sheet 2
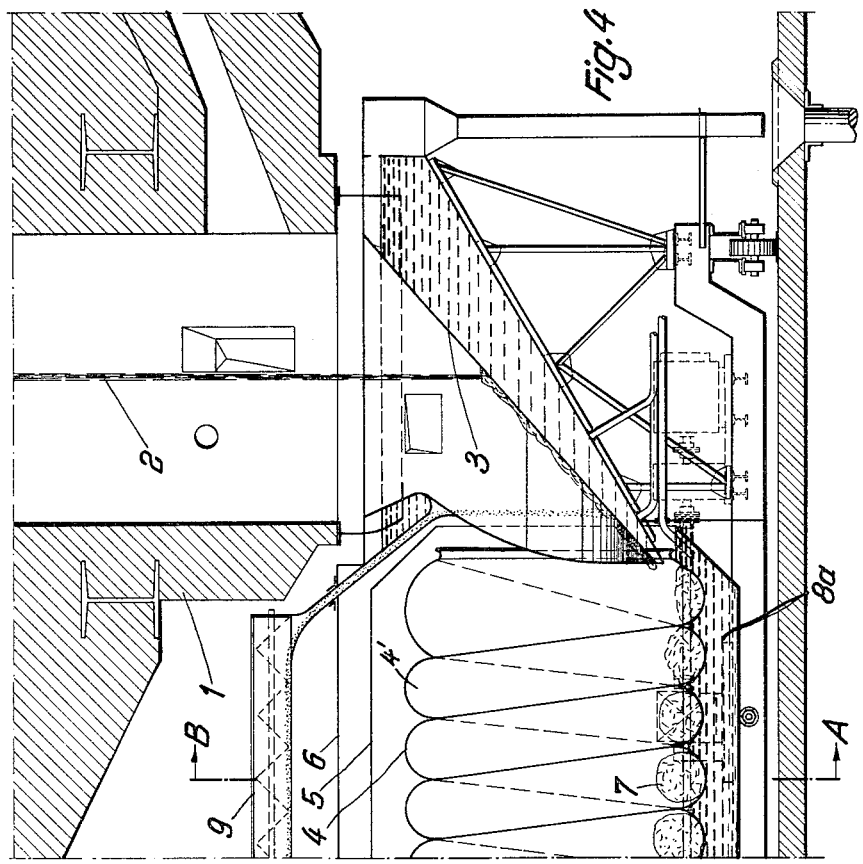
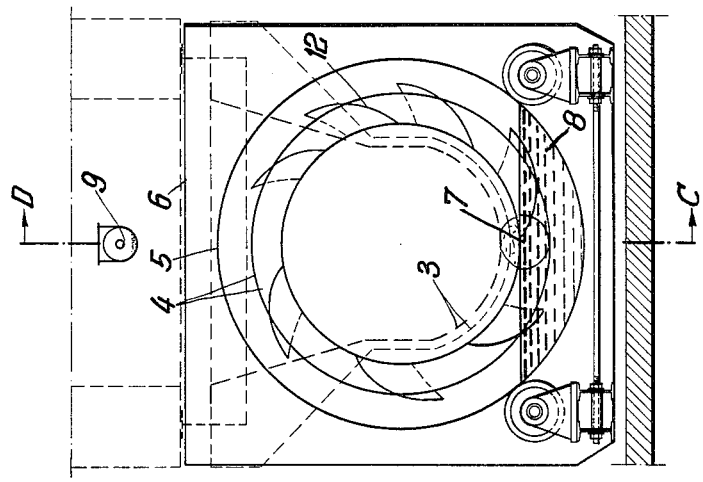
Inventor:
ERICH WOLF
By Hane and Wydick
ATTORNEYS

United States Patent Office 3,223,508
Patented Dec. 14, 1965

3,223,508
MIXING DEVICE FOR ADMIXING ADDITIVES TO A MELT
Erich Wolf, Kassel-Wilhelmshohe, Germany, assignor to Schlosser & Co. G.m.b.H., Michelbach, Germany
Filed Feb. 9, 1961, Ser. No. 88,079
2 Claims. (Cl. 65—142)

The invention relates to a device for admixing solid additive to molten hardening material, and, more particularly, to a device for producing crystalline, preferably fluffed, slag in granular form by admixing solid mineral additives to molten mineral slags.

As is well known, molten slags experience changes when certain minerals are admixed and melted in the melt. For instance, the admixture of volcanic sediments having a high content of water of crystallization to vitreous melts results in products which have a crystalline structure and possess correspondingly favorable physical and chemical properites. The admixture of minerals in solid state to melts of low viscosity and an intimate mixture of the additives with the melt present a considerable technical problem. Mixing devices as heretofore known have been found not to be fully satisfactory.

It is a broad object of the present invention to provide a novel and improved mixing device of the general kind referred to which permits mixing of minerals or other solid additives and a melt in a more thorough and less expensive manner than was heretofore possible.

A more specific object of the invention is to provide a novel and improved mixing device in which an intimate mixing of the additives and the melt is effected while the melt is still fully liquid.

Another more specific object of the invention is to provide a novel and improved device which yields the hardened mixed material in granulated form and which favorably influences the formation of a crystalline structure by the manner in which the hardening of the material during the cooling thereof proceeds.

Molten slags that are particularly suitable for the manufacture of crystalline fluffed granulated material are melts which are withdrawn, in a freely flowing state, from blast furnaces, cupola furnaces and chemical melting furnaces at a temperature of about 1400° C. The melt should be withdrawn from the furnace hearth or chamber either at super-atmospheric or at sub-atmospheric pressure.

The flow of slag is directed into a trough filled with water while the access of air is prevented. The resultant granular slag material, which has a grain size of about 3 mm. or 4 mm. is then removed from the trough by a rake or other suitable device.

Other and further objects, features and advantages of the invention will be pointed out hereinafter and set forth in the appended claims constituting part of the application.

In the accompanying drawing, a preferred embodiment of the invention is shown by way of illustration and not and not by way of limitation.

In the drawing:

FIG. 1 is a longitudinal sectional view of a mixing device according to the invention, FIG. 2 is a fragmentary plan view of the device according to FIG. 1, FIG. 3 is a section taken on line A–B of FIG. 4, FIG. 4 is a section taken on line C–D of FIG. 3, and FIG. 5 shows the discharge chute of the device on an enlarged scale.

Referring now the figures in detail, a flow of molten slag 2 leaves the hearth or melting chamber 1 of a furnace and falls upon a charging or feed chute 3 of the mixing device according to the invention. Chute 3 is downwardly slanted and is cooled by means of a cooling jacket indicated as 8. The mixing device comprises a horizontally disposed casing 6, which is air-tight and joined to chute 3 by an air-tight connection, as is shown in FIGS. 1 and 4. Casing 6 houses two rotary, generally cylindrical and coaxial disposed tubes 4 and 5 usually made of iron.

The inner tube is formed by a plurality of rings 4' which are coaxially joined at a slant to define a spiral groove within tube 4. As is shown in FIGS. 1 and 4, the peripheral wall of each ring 4' is concavely curved in reference to the rotary axis of tubes 4 and 5 or, in other words, each ring has a rounded cross-section. An annular space 8a is formed between tubes 4 and 5, which may be filled with a coolant or through which a coolant may be circulated to cool the inner tube. As is evident, the highest thermal demands are made upon the rings 4' adjacent to the feeding end of tube 4. To effect an intensive cooling of that part of tube 4, the first few rings thereof, such as the first three rings, have scoops or blades 12, which serve to agitate the coolant in the cooling space between the two tubes, thus intensifying the cooling of tube 4 near the feeding end thereof. In addition to protecting tube 4, the cooling thereof affords the advantage that the molten slag material will not tend to adhere to the cooled walls of the tube.

The additives, such as minerals, may be added in the form of discrete particles of suitable grain size by means of a screw or worm conveyor 9. The conveyor serves to dose the quantity of additives to be added and feeds the same to the mixing device at the same end at which slag material is fed to the device. The mixed and hardened material is discharged from the device through a discharge chute 10 of conventional design. Chute 10 communicates with casing 6, and thus also with the discharge end of tube 4. The chute may be a lock of the kind used for blast furnaces. A dump cart 11 may be provided to transport the finished material to a location of use.

The operation of the mixing device is hereinbefore described is as follows:

As best shown in FIG. 4, the molten slag is directed by chute 3 into the first ring 4' of tube 4. Just before the slag reaches the ring, the additives are fed to the slag.

Due to the rotation of tubes 4 and 5, which may be effected by a conventional motor drive as shown in the figures, the melt and the mineral additives are thoroughly mixed whereby the minerals are melted and initiate the reaction in the melt.

The quantity of the mineral additives which is required to be added to effect the desired structural and mineral changes in the melt, are usually in the order of 5% to 10%.

The melt remains liquid while traveling through the first two or three rings 4', then the slag, or rather the mixture, begins slowly to solidify whereby the mass of the mixture is initially coated with a thin skin. As the mixture travels further along the spiral groove within tube 4, spheres 7 are gradually formed, which are moved automatically and continuously toward the discharge end of tube 4 due to the grooving thereof.

Tests have shown that an intimate mixture is obtained with the device according to the invention and that the granulated material which is obtained by the melting of the minerals in the molten slag possesses a stable crystalline structure and is fluffed up to 40%. Furthermore, the solidification of the mixture in rotary tube 4 occurs very slowly and during the entire travel of the material through the tube. While the spheres obtain rapidly a skin sufficiently strong to preserve the spherical shape, tests have shown that they retain in the interior a labile structure at very high temperature generated due to the exothermic effect released by the mineral additives. This is of great importance for the formation of a crystalline structure, since a prolonged delay of the cooling of the interior of the spheres causes a tempering, which is advantageous for the quality of the crystallization.

Crystalline and fluffed slag material obtained in a mixing device according to the invention constitutes a highly useful raw material for industries using light concrete. The specific raw weight is about 0.8 due to the strong fluffing and can be conveniently and accurately controlled by varying the quantity of the added minerals.

The hardness of the material is about of the order of a hardness 6 or 7 measured according to the scale.

While the invention has been described in detail with respect to a certain now preferred example and embodiment of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A device for admixing solid additives in the form of discrete particles to a molten hardening material, said device comprising a generally cylindrical forming tube having in its wall surface a spiral groove of concave cross section in reference to the interior of the tube, said tube being rotary about its longitudinal axis, first feed means for feeding the molten material while in its liquid state into the tube at one end thereof, second feed means for feeding the solid additives into the tube at the same end thereof, thereby effecting mixing of the molten material and the additives, a second rotary tube encompassing the forming tube radially spaced therefrom to define between the two tubes an annular space for a coolant to cause hardening of the mixture during the travel thereof along the spiral groove of the rotary tube, a stationary air-tight casing, both said tubes being mounted within the casing rotatable in reference thereto, and a discharge chute disposed adjacent the other end of the tube and in communication therewith for discharging the hardened mixture at said end of the forming tube.

2. A device according to claim 1 wherein scoops are mounted on the outside of the forming tube in circumferentially spaced arrangement for rotation in unison with the forming tube to agitate a coolant in said annular space, said scoops being disposed adjacent to the feeding end of the forming tube.

References Cited by the Examiner
UNITED STATES PATENTS

| | | | |
|---|---|---|---|
| 1,051,844 | 1/1913 | Passon | 65—14 |
| 1,164,718 | 12/1915 | Hill | 65—143 |
| 1,340,690 | 5/1920 | Waechter. | |
| 1,444,953 | 2/1923 | Crane | 65—87 |
| 1,527,729 | 2/1925 | Dunajeff. | |
| 1,877,965 | 9/1932 | Pursley | 165—109 |
| 2,078,158 | 4/1937 | Powell | 65—5 |
| 2,332,361 | 10/1943 | Anastor et al. | 65—143 |
| 2,536,752 | 1/1951 | Kingston | 165—132 X |
| 2,908,486 | 10/1959 | Thornburg | 65—356 X |
| 2,961,720 | 11/1960 | Rayburn | 22—1 |

DONALL H. SYLVESTER, *Primary Examiner.*

ARTHUR P. KENT, WILLIAM B. KNIGHT,
*Examiners.*